United States Patent
Gauthier

(10) Patent No.: US 9,826,293 B2
(45) Date of Patent: Nov. 21, 2017

(54) CONTROL SYSTEM AND SUBSCRIBER DEVICE OF A COMMUNICATIONS NETWORK OF A CONTROL SYSTEM

(71) Applicant: Airbus Operations S.A.S., Toulouse (FR)

(72) Inventor: Stéphane Gauthier, Toulouse (FR)

(73) Assignee: Airbus Operations S.A.S. (FR)

( * ) Notice: Subject to any disclaimer, the term of this patent is extended or adjusted under 35 U.S.C. 154(b) by 11 days.

(21) Appl. No.: 15/013,364

(22) Filed: Feb. 2, 2016

(65) Prior Publication Data

US 2016/0234581 A1    Aug. 11, 2016

(30) Foreign Application Priority Data

Feb. 10, 2015   (FR) .................................... 15 51068

(51) Int. Cl.

| | |
|---|---|
| *H04B 10/08* | (2006.01) |
| *H04B 17/00* | (2015.01) |
| *H04J 14/00* | (2006.01) |
| *H04B 10/00* | (2013.01) |
| *H04B 10/12* | (2006.01) |

(Continued)

(52) U.S. Cl.
CPC ....... *H04Q 11/0066* (2013.01); *H04B 10/803* (2013.01); *H04Q 2011/0081* (2013.01)

(58) Field of Classification Search
CPC ...... H04B 10/12; H04B 10/25; H04B 10/801; H04J 14/02
USPC .................. 398/48, 141, 131; 385/16, 18
See application file for complete search history.

(56) References Cited

U.S. PATENT DOCUMENTS 4,892,376 A * 1/1990 Whitehouse ......... H04B 10/803
                                                            250/201.1
5,204,866 A * 4/1993 Block .................. H04B 10/803
                                                            372/27

(Continued)

FOREIGN PATENT DOCUMENTS

| DE | 4228733 A1 | 3/1994 |
|---|---|---|
| EP | 1681897 A1 | 7/2006 |

(Continued)

OTHER PUBLICATIONS

French Search Report (dated Dec. 16, 2015) (FR 1551068).

*Primary Examiner* — David Payne
*Assistant Examiner* — Pranesh Barua
(74) *Attorney, Agent, or Firm* — Lerner, David, Littenberg, Krumholz & Mentlik, LLP

(57) ABSTRACT

A control system includes a plurality of subscriber devices of a communications network, these subscriber devices communicating with one another by optical signals. A subscriber device includes two opposing faces, an optical shutter controllable between an at least partially transparent state and an opaque state, the optical shutter traversing a part of the subscriber device between the two opposing faces; a control circuit configured for controlling the controllable optical shutter; an optical signal emitter on a first of the two opposing faces, disposed in such a manner as to allow the emission of optical signals toward a first neighboring subscriber device; and an optical signal receiver on a second of the two opposing faces, disposed in such a manner as to allow optical signals to be received that originate from a second neighboring subscriber device.

13 Claims, 5 Drawing Sheets

(51) Int. Cl.
*H04Q 11/00* (2006.01)
*H04B 10/80* (2013.01)

(56) References Cited

U.S. PATENT DOCUMENTS

| | | | | |
|---|---|---|---|---|
| 5,548,772 A * | 8/1996 | Lin | ................ | G06E 3/001 359/11 |
| 5,832,147 A * | 11/1998 | Yeh | ................ | G02B 5/32 359/15 |
| 6,270,262 B1 * | 8/2001 | Hudgins | ................ | G02B 6/43 361/699 |
| 6,452,700 B1 * | 9/2002 | Mays, Jr. | ................ | H04B 10/801 359/15 |
| 7,729,613 B2 * | 6/2010 | Lauder | ................ | H04B 10/077 398/15 |
| 8,275,266 B2 * | 9/2012 | Tan | ................ | G02B 6/43 398/118 |
| 2003/0081281 A1 * | 5/2003 | DeCusatis | ................ | H04B 10/801 398/79 |
| 2008/0304832 A1 * | 12/2008 | Williams | ................ | H04B 10/803 398/131 |
| 2010/0028018 A1 * | 2/2010 | Tan | ................ | H04B 10/803 398/141 |
| 2012/0195548 A1 * | 8/2012 | Brunner | ................ | H04B 10/803 385/18 |
| 2012/0213469 A1 * | 8/2012 | Jia | ................ | H04B 10/801 385/14 |
| 2013/0202288 A1 * | 8/2013 | Jia | ................ | H04B 10/25 398/15 |
| 2013/0236183 A1 * | 9/2013 | Chao | ................ | H05B 33/0827 398/101 |

FOREIGN PATENT DOCUMENTS

| | | | | |
|---|---|---|---|---|
| GB | 2247127 A * | 2/1992 | ............ | H04B 10/803 |
| JP | EP 1681897 A1 * | 7/2006 | ............ | G02B 6/352 |

* cited by examiner

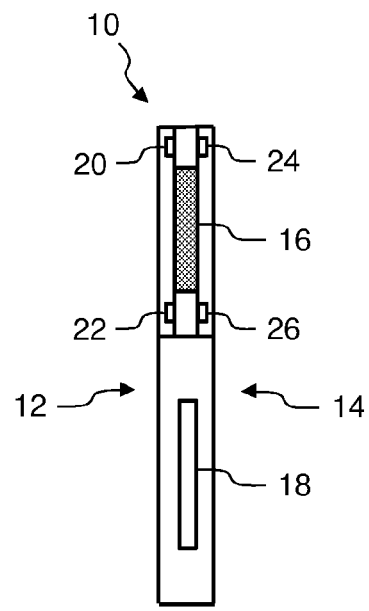
Fig. 3
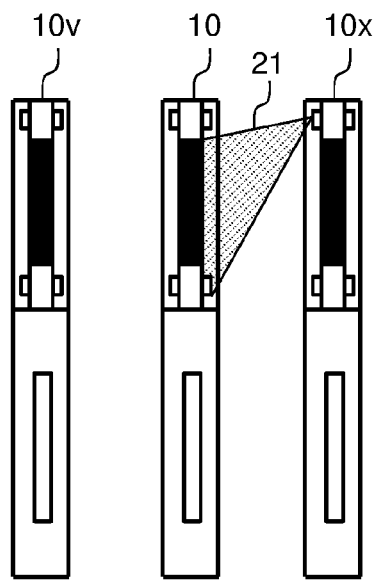  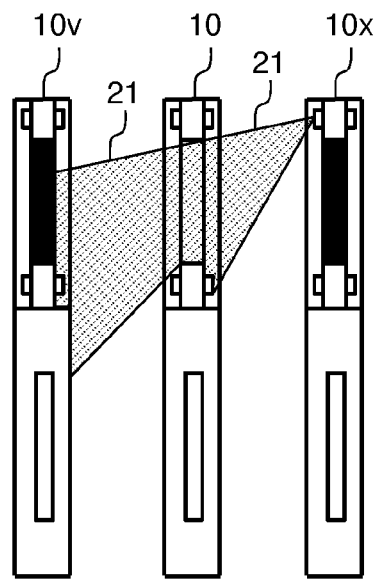
Fig. 4a              Fig. 4b

CONTROL SYSTEM AND SUBSCRIBER DEVICE OF A COMMUNICATIONS NETWORK OF A CONTROL SYSTEM

FIELD OF THE INVENTION

The invention relates to a control system, in particular in an aircraft, the control system comprising a plurality of devices subscribers to a communications network. The invention also relates to a device subscriber to the communications network, and also to an aircraft comprising such a control system.

BACKGROUND OF THE INVENTION

Modern aircrafts comprise one or more control systems. These control systems notably perform functions for guiding the aircraft, for management of its flight path, for management of the alarms, for management of the maintenance, etc. These control systems generally comprise one or more computers communicating with each other via an onboard communications network. Conventionally, one computer can be dedicated to one particular function. In the recent aircraft, these computers may be replaced, at least in part, by modular avionics computers of the IMA (Integrated Modular Avionics) type. Each IMA computer can host several applications corresponding to functions conventionally implemented by separate dedicated computers. The various computers, whether they be of the dedicated or IMA type, generally take the form of a rack accommodating several electronics boards connected to a bus of the back-plane type. Several computers of an aircraft are generally assembled in electronics cabinets, in an area of the aircraft commonly referred to as the "electronics bay", these computers being connected to an onboard communications network in such a manner as to be able to exchange information between them and/or with other computers of the aircraft. Each computer corresponds to a subscriber to said communications network. Each computer may for example be connected to a switch of a deterministic full-duplex Ethernet communications network, such as for example an AFDX® data network. Other embodiments may be envisioned, for example a communications network of the ring type. The various computers, whether they be of the dedicated or IMA type, are commonly referred to as LRU (Line Replacement Unit), because, in the case of a failure, the rack corresponding to a computer must be removed from the aircraft, since an electronics board cannot be removed from the rack and replaced onboard the aircraft during the operation of the computer.

In modern aircrafts, the LRU computers may be replaced by electronics enclosures. The principle of an enclosure is to assemble, within the same rack, electronics boards each supporting functionalities usually supported by an LRU. These electronics boards share common resources, such as for example an electrical power supply, a switch of a communications network, etc. These resources are generally supported by other electronics boards integrated into the rack, for example an electrical power supply board, a communications network switch board, etc. The various electronics boards of an enclosure are referred to as LRM (Line Replacement Module), because it is possible to replace a board of an enclosure without interrupting the operation of the latter. The various LRMs of an enclosure generally communicate with one another via a communications network, in particular by means of an aforementioned switch. The various electronics enclosures of an aircraft are generally integrated into the avionics bay.

In the case of a communications network connecting together several subscribers to this communications network, these subscribers corresponding in particular to LRUs or to LRMs and the network comprising a switch, a failure of the switch can lead to the impossibility of communicating for all of the computers connected to this switch. In order to pre-empt this eventuality, a redundancy of the switches is generally provided in an onboard communications network. In the case of a communications network of the ring type, if a computer subscriber to this communications network crashes, this can lead to an interruption of the communications between the other computer subscribers to the network.

BRIEF SUMMARY OF THE INVENTION

Furthermore, in the case of an electronics enclosure, for reasons of space required and of weight, it may be desirable to integrate into the rack of the enclosure as many LRM modules as possible corresponding to useful functions for the aircraft. However, a switch of a communications network integrated into an enclosure corresponds to an electronics board taking up space in the rack, which it could be desirable to recover in order to add an LRM into the enclosure.

An aspect of the present invention may provide a solution to these problems. It relates to a device subscriber to a communications network of a control system, this control system comprising a plurality of devices subscribers to the communications network, these devices subscribers to the communications network communicating with one another by means of optical signals. The subscriber device comprises two opposing faces and it is noteworthy in that it furthermore comprises:

an optical shutter controllable between, on the one hand, an at least partially transparent state allowing the transmission of optical signals between devices subscribers to the communications network and, on the other hand, an opaque state prohibiting the transmission of said optical signals;

a control circuit configured for controlling the optical shutter;

a first optical signal emitter on a first face of the two opposing faces, disposed in such a manner as to allow the emission of optical signals toward a first neighboring subscriber device; and a first optical signal receiver on a second face of the two opposing faces, disposed in such a manner as to allow optical signals to be received that originate from a second neighboring subscriber device, the optical shutter traversing a part of the subscriber device between the two opposing faces, and the control circuit being configured for imposing the opaque state of the optical shutter only if the subscriber device is operational.

Thus, by virtue of the first optical signal emitter and of the first optical signal receiver, the device subscriber to the communications network of the control system is configured for communicating with neighboring subscriber devices. Given that the control circuit is configured for imposing the opaque state of the optical shutter only if the subscriber device is operational, the result of this is that, in the case of a failure of the subscriber device, the optical shutter is in its at least partially transparent state. Consequently, the optical shutter then allows the transmission of optical signals between the first neighboring subscriber device and the second neighboring subscriber device situated on either side of the subscriber device in question. These neighboring subscriber devices can therefore continue to communicate even in the case of a failure of the subscriber device in question. Moreover, the subscriber devices communicate with one another without a communications network switch, a fact which allows, on the one hand, the communications to be rendered insensitive to a failure of such a switch and, on the other hand, a reduction in weight and in space required owing to the absence of such a switch.

According to particular embodiments which may be taken into account in isolation or in combination:

the subscriber device is configured for operation placed in a receptacle, the subscriber device comprising one end comprising a connector designed to cooperate with a connector of the receptacle, said part of the subscriber device traversed by the optical shutter being adjacent to said end;

the subscriber device comprises a detector of opacity of the optical shutter, the subscriber device being configured in such a manner as to allow the emission of an optical signal by means of the first optical signal emitter only if the opacity detector detects an opaque state of the optical shutter;

the subscriber device furthermore comprises:

a second optical signal emitter on the second face of the two opposing faces, disposed in such a manner as to allow the emission of optical signals toward the second neighboring subscriber device; and a second optical signal receiver on the first face of the two opposing faces, disposed in such a manner as to allow optical signals to be received that originate from the first neighboring subscriber device, such that in one advantageous embodiment, the first optical signal emitter together with the first optical signal receiver, on the one hand, and the second optical signal emitter together with the second optical signal receiver, on the other hand, use optical signals of different wavelengths.

According to a first alternative, the wavelengths of the optical signals emitted and/or received by the subscriber device correspond to the infrared light range.

According to a second alternative, the wavelengths of the optical signals emitted and/or received by the subscriber device correspond to the visible light range.

The invention also relates to a control system comprising a communications network, the control system comprising at least three devices subscribers to the communications network, similar to the subscriber device previously described.

Advantageously, the control system comprises at least two receptacles each receiving at least one subscriber device, the control system furthermore comprising at least one optical fiber between a first of said receptacles and a second of said receptacles, this optical fiber allowing a communication by means of optical signals between a subscriber device positioned in the first receptacle and a subscriber device positioned in the second receptacle.

According to one embodiment, the control system comprises at least one receptacle receiving at least three subscriber devices placed between a first end and a second end of said receptacle, the receptacle furthermore comprising at least one reflector at at least one of said first and second ends.

According to another embodiment, the control system comprises at least one receptacle receiving at least three subscriber devices placed between a first end and a second end of said receptacle, the control system furthermore comprising at least one optical fiber allowing an optical communication between said first and second ends.

The invention also relates to an aircraft comprising a control system such as the aforementioned.

BRIEF DESCRIPTION OF THE DRAWINGS

The invention will be better understood upon reading the description that follows and upon examining the appended figures.

FIG. 3 shows the device in FIG. 2, seen in a direction corresponding to the arrow V in FIG. 2.

FIGS. 4a and 4b show a partial illustration of a control system comprising devices subscribers to a communications network, such as that shown in FIG. 3.

Figure 6:
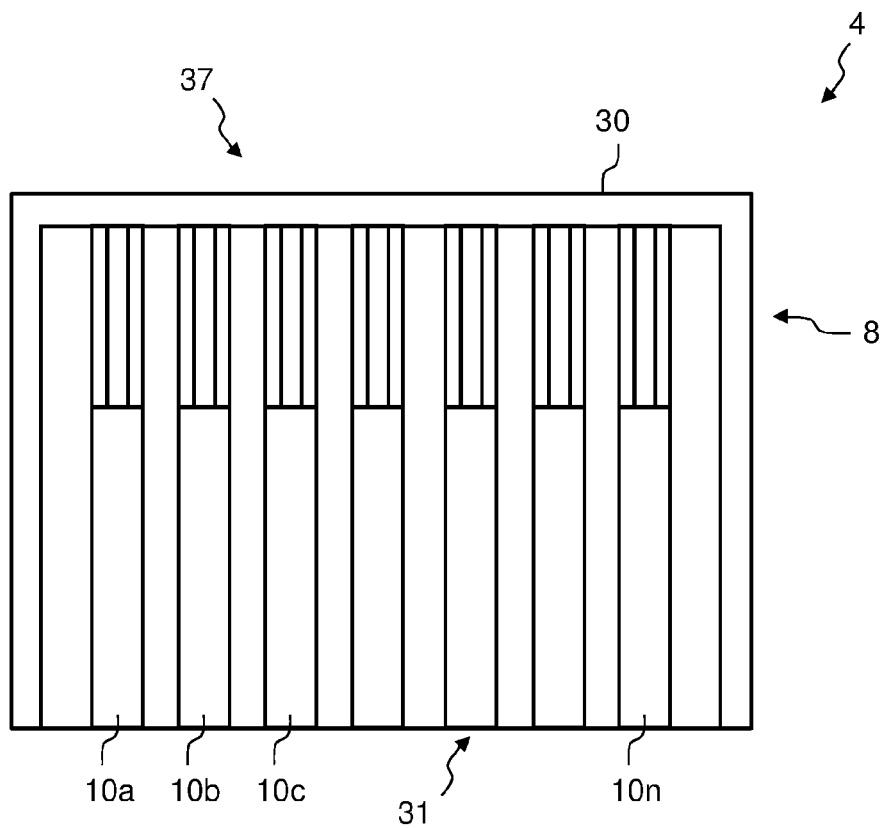
FIGS. 6 and 7 show, in a simplified manner, as a top view, a receptacle receiving a plurality of devices such as that shown in FIG. 2.
Figure 9:
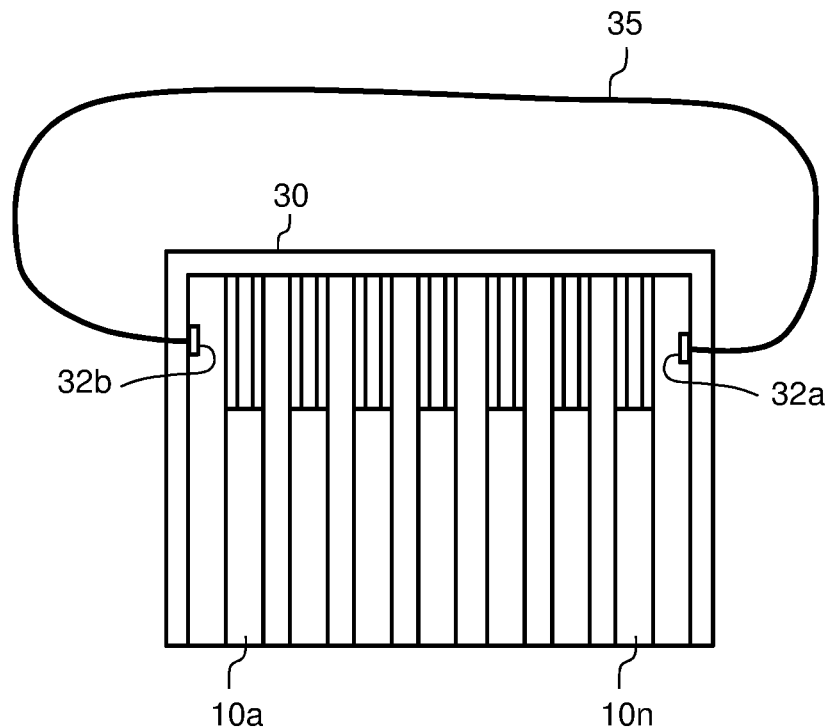
Figure 10:
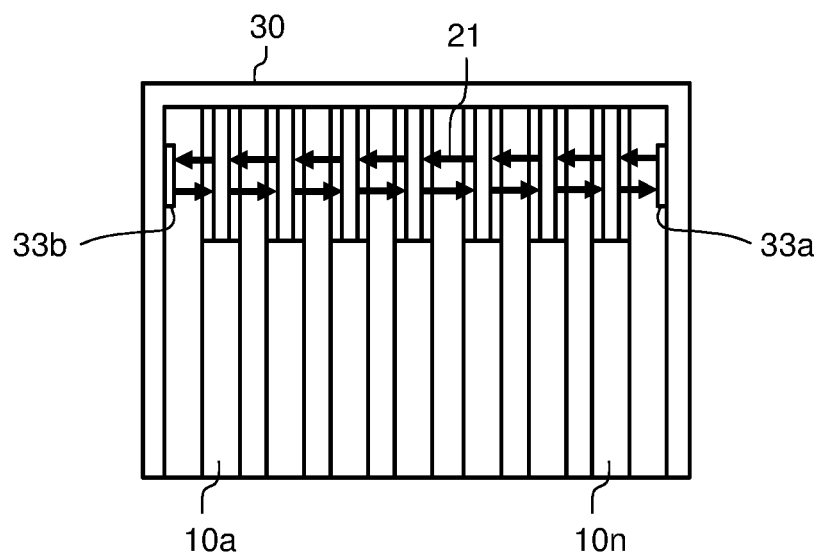

The FIGS. 9 and 10 show schematically particular embodiments of a control system comprising a receptacle such as that shown in FIG. 6.

DETAILED DESCRIPTION

Figure 1:
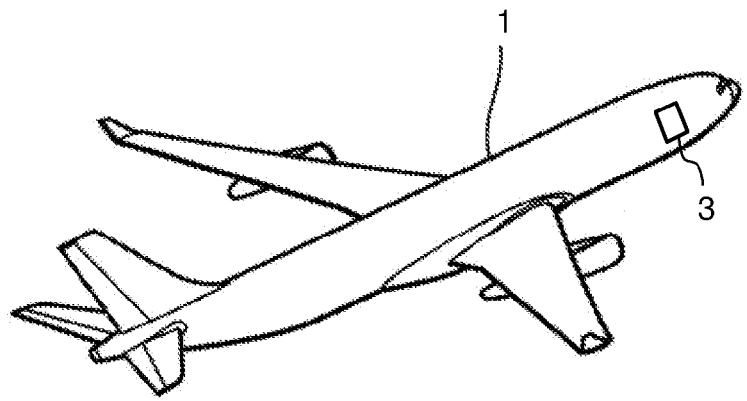
FIG. 1 illustrates, in a simplified manner, an aircraft comprising an avionics bay.
Figure 2:
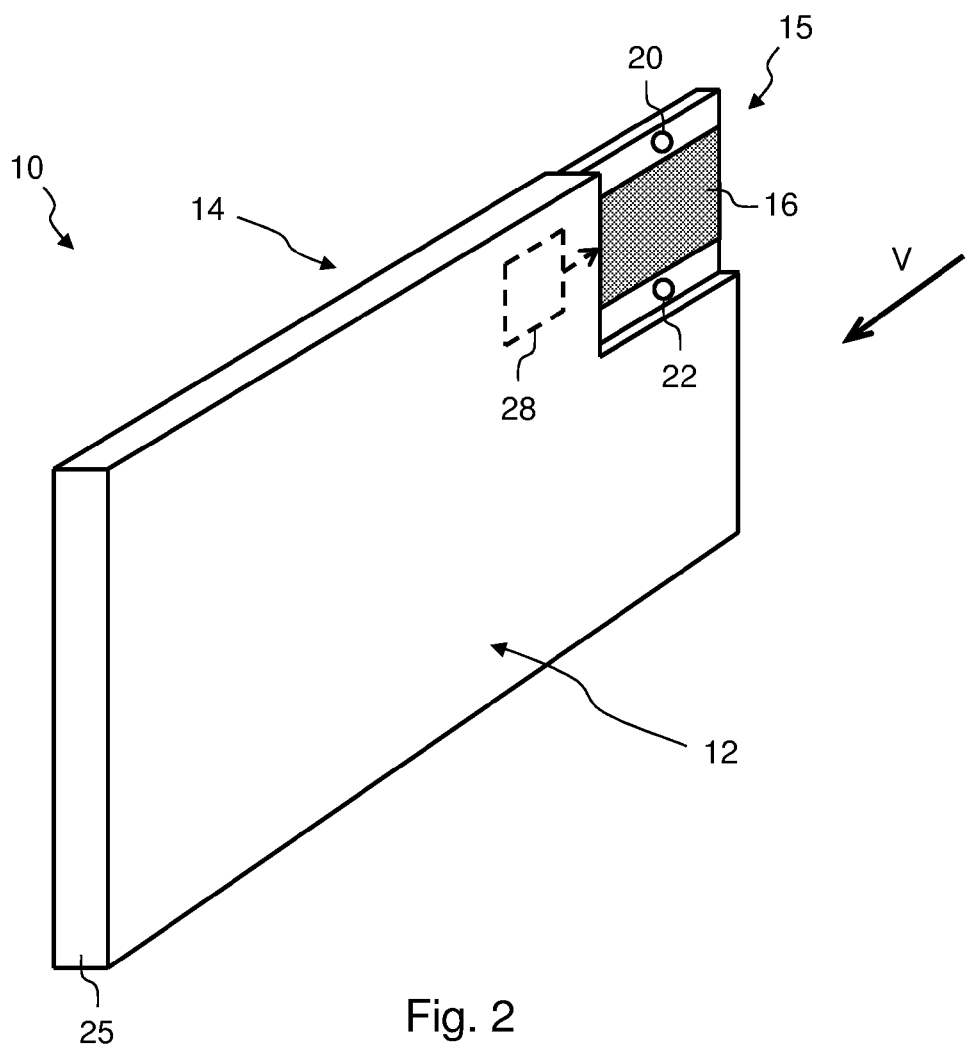
FIG. 2 is a simplified perspective view of a device subscriber to a communications network of a control system, according to one embodiment of the invention.

The device 10 subscriber to a communications network of a control system, shown in FIGS. 2 and 3, comprises two opposing faces 12 and 14. The subscriber device also comprises an optical shutter 16, this optical shutter traversing a part 15 of the subscriber device 10, between the two opposing faces 12 and 14. The optical shutter 16 is controllable between, on the one hand, an at least partially transparent state allowing the transmission of optical signals and, on the other hand, an opaque state prohibiting the transmission of said optical signals. The subscriber device also comprises a control circuit 28 configured for controlling the optical shutter 16. More particularly, the control circuit 28 is configured for imposing the opaque state of the optical shutter 16 only if the subscriber device 10 is operational. The subscriber device comprises a first optical signal emitter 20 on the face 12, disposed in such a manner as to allow the emission of optical signals toward a first neighboring subscriber device. It also comprises a first optical signal receiver 26 on the face 14, disposed in such a manner as to allow optical signals to be received that originate from a second neighboring subscriber device. Advantageously, the subscriber device 10 furthermore comprises a second optical signal emitter 24 on the face 14, disposed in such a manner as to allow the emission of optical signals toward the second neighboring subscriber device, together with a second optical signal receiver 22 on the face 12, disposed in such a manner as to allow optical signals to be received that originate from the first neighboring subscriber device.

According to one embodiment, the optical shutter 16 corresponds to a liquid crystal device, having a transparent, or at least partially transparent, state when it is not electrically powered and having an opaque state when it is electrically powered. According to another embodiment, the optical shutter 16 corresponds to an electrically-controlled diaphragm, this diaphragm being open in the absence of an electrical power supply and closed when it is electrically powered.

According to one embodiment, the control circuit 28 is configured for imposing the opaque state of the optical shutter 16 when the subscriber device 10 is electrically powered. The control circuit 28 may then be limited to a circuit supplying electrical power to the optical shutter 16 when the subscriber device 10 is electrically powered. According to another embodiment, the control circuit 28 is configured for receiving signals corresponding to a correct operation of the subscriber device 10 and for only imposing the opaque state of the optical shutter when such signals have been received for a period of time shorter than a predetermined threshold. In such a case, the control circuit 28 may for example correspond to a circuit of the watchdog type, which may notably be integrated into a processor of the subscriber device 10.

In normal operation, when the subscriber device 10 is operational, the control circuit 28 imposes the opaque state of the optical shutter 16. As a consequence, as shown in FIG. 4a, optical signals 21 emitted by one of the first or second neighboring subscriber devices 10v, 10x are received by the first optical signal receiver 26 or by the second optical signal receiver 22, but these optical signals are not received by the other of said first or second neighboring subscriber devices since they are blocked by the optical shutter 16. Thus, only the subscriber device 10 receives the optical signals emitted by this neighboring subscriber. After the optical signals have been received by the first optical signal receiver 26 or by the second optical signal receiver 22, the subscriber device 10 analyzes information corresponding to these optical signals. If this information is addressed to the subscriber device 10, it exploits it. Otherwise, if this information is addressed to another subscriber device, the subscriber device 10 emits optical signals corresponding to this information, by means of the first optical signal emitter 20 or of the second optical signal emitter 24, destined for the other of said first or second neighboring subscriber devices.

On the other hand, when the subscriber device 10 is not operational, the optical shutter 16 remains in its at least partially transparent state. Thus, as shown in FIG. 4b, when the subscriber device 10 is not operational, optical signals 21 emitted by one of the first or second neighboring subscriber devices 10v, 10x can pass through the optical shutter 16 and thus be directly received by the other of said first or second neighboring subscriber devices. This allows the continuity of the communications between these two neighboring subscriber devices to be guaranteed even when the subscriber device 10 is not operational or is absent. A failure of the subscriber device 10 does not therefore affect the communications between the other subscriber devices of the communications network.

Figure 5:
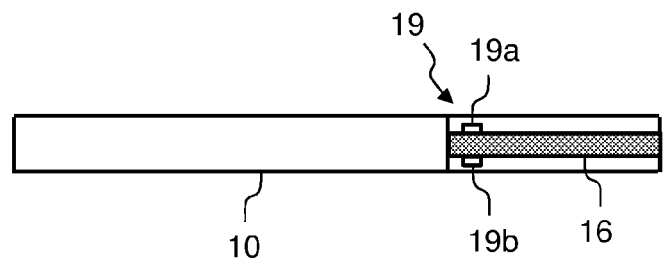
FIG. 5 shows one embodiment of the device in FIG. 2, as a top view.

In one particular embodiment shown in FIG. 5, the subscriber device 10 comprises a detector of opacity 19 of the optical shutter 16. This opacity detector may for example comprise an optical signal emitter 19a and an optical signal receiver 19b disposed facing one another, on either side of the optical shutter 16. The emitter 19a and the receiver 19b are connected to an electrical circuit of the subscriber device 10. When the subscriber device 10 is electrically powered up, the emitter 19a emits an optical signal toward the optical signal receiver 19b. If the optical shutter 16 is in its opaque state, the receiver 19b does not receive this optical signal and said electrical circuit enables a signal corresponding to the opaque state of the optical shutter. If the optical shutter 16 is in its at least partially transparent state, the receiver 19b receives this optical signal and said electrical circuit disables the signal corresponding to the opaque state of the optical shutter. Advantageously, the subscriber device 10 is configured for controlling the emission of optical signals by the first optical signal emitter 20 and/or by the second optical signal emitter 24, only if the signal corresponding to the opaque state of the optical shutter is enabled. This allows interference effects between the optical signals emitted by the subscriber device 10 and optical signals emitted by a neighboring subscriber device to be avoided.

Advantageously, the first optical signal emitter 20, together with the first optical signal receiver 26, on the one hand, and the second optical signal emitter 24, together with the second optical signal receiver 22, on the other hand, use optical signals of different wavelengths. This allows interference effects between the optical signals emitted by the subscriber device 10 toward a neighboring subscriber device and optical signals received by the subscriber device 10 to be avoided, these received optical signals originating from said neighboring subscriber device. This therefore enhances the reliability of bidirectional communications between the subscriber device 10 and this neighboring subscriber device.

According to one particular embodiment, the wavelengths of the optical signals emitted and/or received by the subscriber device correspond to the infrared light range. This allows a better transmission of the optical signals in the presence of smoke. This results in an enhanced availability of the communications between the devices subscribers to the communications network in the case where the latter might be required to operate in an smoke-filled environment.

Figure 7:
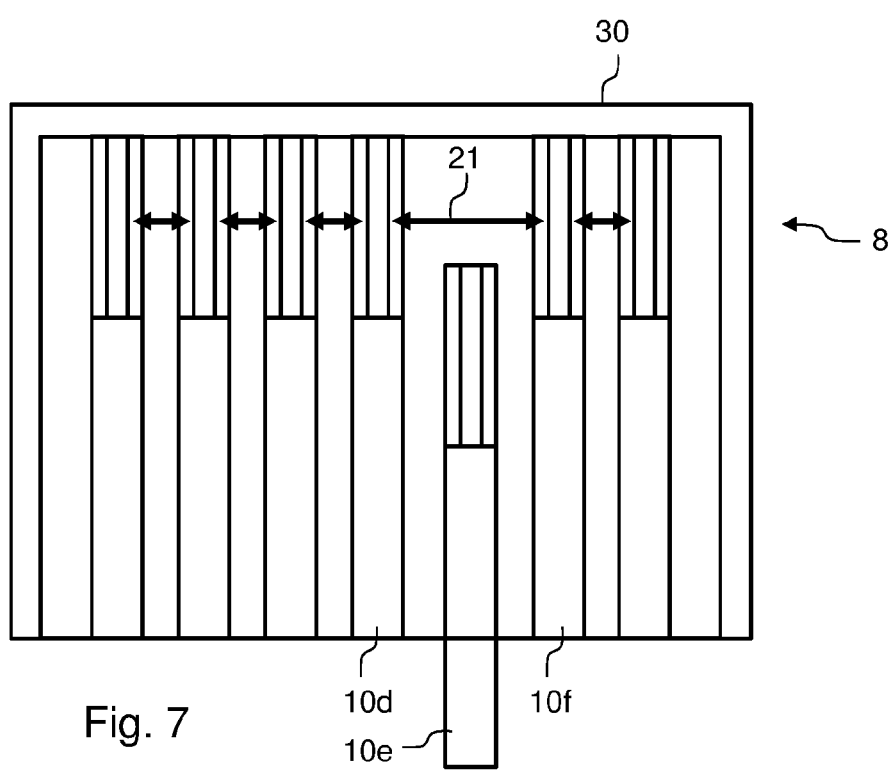

In one advantageous embodiment, the subscriber device 10 is designed to operate placed in a receptacle 30. In one example shown in FIG. 6, the receptacle corresponds to a rack 30 receiving several subscriber devices 10a, 10b, 10c . . . 10n. These subscriber devices then correspond to electronics boards. The electronics boards may be introduced into the rack 30 via a front face 31 of said rack. Each electronics board has a front face 25 such that this front face substantially corresponds to the front face 31 of the rack when the electronics board is placed in the rack. Each electronics board comprises a connector 18 on a rear face opposite to its front face 25. This connector is designed to be connected to a lower part of a rear face 37 of the rack, for example to a back-plane board. The part 15 of the electronics board traversed by the optical shutter 16 is adjacent to said rear face of the electronics board, comprising the connector 18. Thus, as shown in FIG. 7, if a board 10e is partially inserted into the rack 30, it cannot form an obstacle to the exchange of optical signals 21 between two neighboring electronics boards 10d and 10f: either it is hardly inserted at all into the rack and then no part of the board 10e can hinder the passage of the optical signals 21, or the board 10e is almost completely inserted into the rack 30 and then the optical signals 21 can pass through the optical shutter 16 because the latter is in its at least partially transparent state given that the electronics board is not operational since it is partially inserted into the rack 30. The receptacle 30 and the subscriber devices 10a, 10b, 10c . . . 10n form a control system 4. This control system comprises a communications network 8, to which the various devices 10a, 10b, 10c, . . . , 10n are subscribed. This communications network 8 is based on the exchange of the optical signals 21 between the subscriber devices, by means of the optical signal emitters and receivers of said subscriber devices. The communications take place from one subscriber device to a neighboring subscriber device. In the case where a first subscriber device has to send information to a second subscriber device which is not physically neighboring the first subscriber device in the receptacle 30, the first subscriber device sends this information to a neighboring subscriber device which retransmits it to another neighboring subscriber device, which can again retransmit it to another neighboring subscriber device, until the point where this information is received by the second subscriber device. The various communications between the subscriber devices take place according to the principle of a ring communications network, even if the communications network 8 is not necessarily looped back according to a ring topology at its ends corresponding to the subscriber devices 10*a* and 10*n*.

Figure 8:
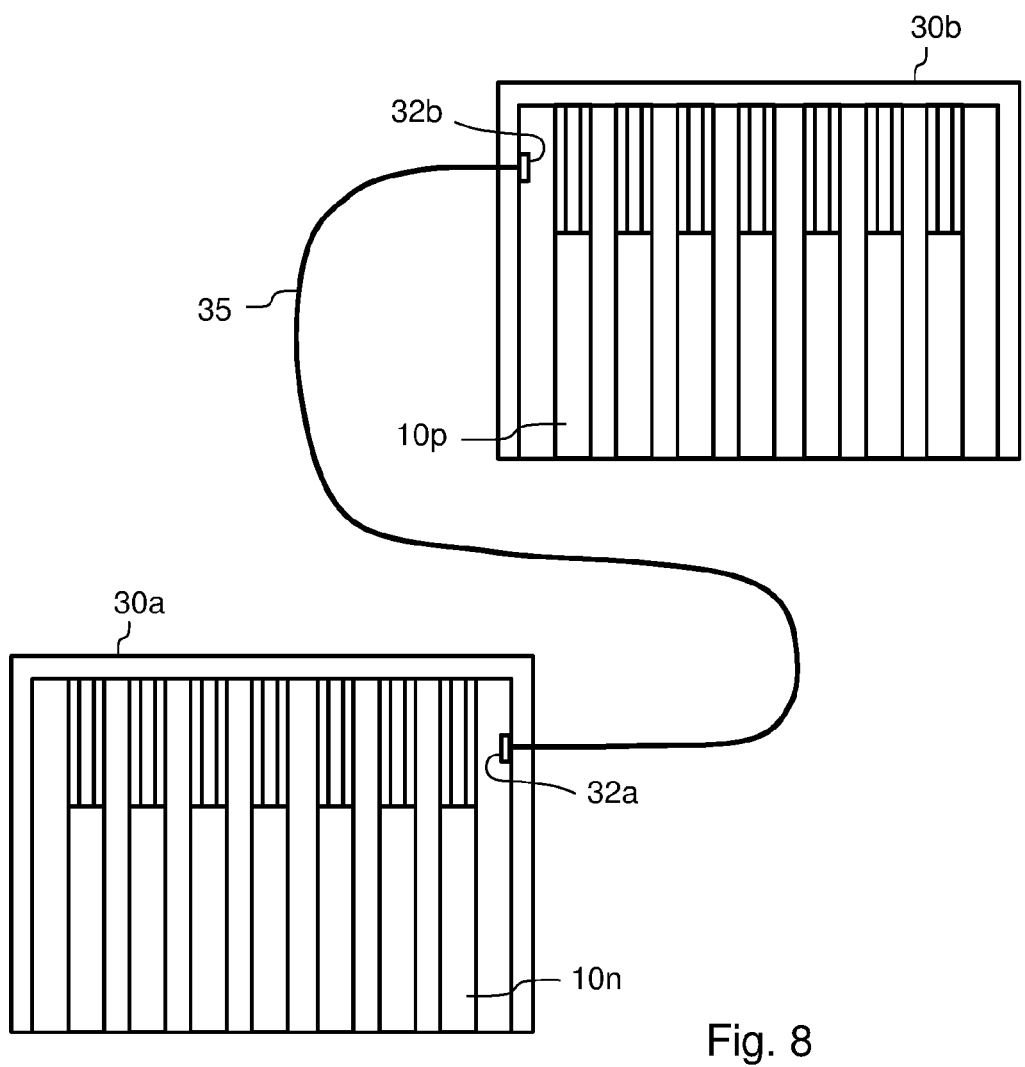
FIG. 8 shows one particular embodiment of a control system comprising two receptacles such as that shown in FIG. 6.

In one particular embodiment shown in FIG. 8, the control system comprises several receptacles 30*a*, 30*b*, such as for example the aforementioned rack 30, receiving devices subscribers to a communications network. The control system furthermore comprises at least one optical fiber 35 between a first 30*a* of said receptacles and a second 30*b* of said receptacles. The first receptacle 30*a* comprises an optical fiber interface device 32*a* on a sidewall of said first receptacle, facing an optical signal emitter (or receiver) of a subscriber device 10*n* situated within this first receptacle. In a similar manner, the second receptacle 30*b* comprises an optical fiber interface device 32*b* on a sidewall of said second receptacle facing an optical signal receiver (or respectively emitter) of a subscriber device 10*p* situated within this second receptacle. Thus, optical signals emitted by an optical signal emitter of the subscriber device 10*n* are routed to an optical signal receiver of the subscriber device 10*p*, via the interface device 32*a*, the optical fiber 35 and the interface device 32*b*. The optical fiber 35 thus allows a communication by means of optical signals between the subscriber device 10*n* positioned in the first receptacle 30*a* and the subscriber device 10*p* positioned in the second receptacle 30*p*. The same principle may be applied in the case of a control system comprising more than two receptacles: the various receptacles may then be cascaded by means of optical fibers.

According to a first alternative, the interface device 32*a* is positioned on said sidewall of the first receptacle 30*a* in such a manner that this interface device can at the same time receive optical signals emitted by an optical signal emitter of the subscriber device 10*n*, in order to transmit these optical signals over the optical fiber 35, on the one hand, and transmit optical signals coming from the optical fiber 35 towards an optical signal receiver of the subscriber device 10*n*, on the other hand. This allows a bidirectional communication between the first receptacle 30*a* and the second receptacle 30*b*, using a single optical fiber 35. According to a second alternative, the optical fiber and its interface devices are duplicated: a first optical fiber allows the communications from the first receptacle 30*a* to the second receptacle 30*b* and, a second optical fiber allows the communications from the second receptacle 30*b* to the first receptacle 30*a*.

Aside from the communication between subscriber devices situated within two separate receptacles as previously described, an optical fiber 35 may also be used to allow the communication between two subscriber devices situated at two lateral ends of the same receptacle. Such an embodiment is shown in FIG. 9. The receptacle 30 then comprises two optical fiber interface devices 32*a*, 32*b*, situated on two opposing sidewalls of the receptacle 30, facing optical signal emitter(s) (respectively receiver(s)) of two subscriber devices 10*n*, 10*a* situated within said receptacle 30. The various subscriber devices situated within the receptacle can thus communicate according to a ring topology. In a similar manner, when the control system comprises several receptacles connected by optical fibers as previously described, this control system may comprise an optical fiber between a last and a first of said receptacles in such a manner as to allow the communication of the various subscriber devices, situated within said receptacles, according to a ring topology.

Another embodiment may be envisioned in the case of a control system whose various devices subscribers to the communications network are situated within the same receptacle 30, in such a manner as to allow the communication of the various subscriber devices, situated within this receptacle, according to a ring topology. In this embodiment shown in FIG. 10, the various optical signals exchanged between the devices subscribers to the communications network must correspond to the same wavelength. The receptacle 30 comprises two reflectors 33*a* and 33*b* disposed on two opposing sidewalls of the receptacle 30, facing emitters and receivers of a subscriber device 10*n* and of a subscriber device 10*a*, respectively, situated within the receptacle 30. By virtue of the reflector 33*a*, the optical signals emitted by the first optical signal emitter 20 of the subscriber device 10*n* are received by the second optical signal receiver 22 of the same subscriber device 10*n*. In the same way, by virtue of the reflector 33*b*, the optical signals emitted by the second optical signal emitter 24 of the subscriber device 10*a* are received by the first optical signal receiver 26 of the same subscriber device 10*a*. Thus, the optical signals 21 are exchanged between the various devices subscribers to the communications network according to a ring topology.

In one alternative to this other embodiment, the subscriber devices are configured to detect whether they are placed at one end of the receptacle. For example, a device may detect that it is placed at one end of the receptacle if it emits optical signals by means of an optical signal emitter disposed on one of its faces and if it does not receive any response on an optical signal receiver disposed on the same face. The subscriber devices are configured in such a manner that, when a subscriber device detects that it is placed at one end of the receptacle, if it receives optical signals from a neighboring subscriber device, it re-emits these same optical signals toward this neighboring subscriber device. This allows the correct operation of a communications network according to a ring topology to be guaranteed.

In one particular embodiment, the control system is an onboard control system of an aircraft 1. The receptacle (or receptacles) 30 is (are) then situated within an avionics bay 3 of the aircraft. Various variants may be envisaged as far as the receptacle 30 and the subscriber devices situated within said receptacle are concerned.

According to one variant, the receptacle 30 is an electronics rack corresponding to an enclosure and containing an assembly of electronics boards plugged into a back-plane connector of said rack. These electronics boards are then referred to as LRMs as previously indicated. Each of the electronics boards then corresponds to a subscriber device 10*a*, . . . 10*n*. The electronics enclosure is provided for implementing one function of the aircraft, such as for example the communication of the aircraft with the ground in the case of a communications enclosure. The control system then corresponds to said function, for example a communications system of the aircraft in the aforementioned example.

According to another variant, the receptacle 30 is an electronics cabinet of the avionics bay, receiving a plurality of onboard computers of the aircraft, where these onboard computers may be computers of the IMA type and/or of the LRU type, or even electronics enclosures. Each computer of said plurality of computers then corresponds to a subscriber device 10a, . . . 10n. The control system then corresponds to a global control system of the aircraft performing several functions distributed within the various computers, each of said functions corresponding to an elementary control system of the aircraft (for example a flight management system of the aircraft, a flight-path control system of the aircraft, etc.).

Although various variant embodiments of the invention have been described hereinabove in the particular case of a control system of an aircraft, the invention is not limited to the field of aeronautics. It is applicable to any control system, for example to industrial control systems.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A control system comprising a communications network, wherein the control system comprises at least first, second, and third subscriber devices to the communications network, each of the subscriber device comprising:
   first and second opposing faces;
   an optical shutter controllable between an at least partially transparent state allowing the transmission of optical signals between the subscriber devices to the communications network and an opaque state prohibiting the transmission of said optical signals;
   a control circuit configured for controlling the optical shutter;
   a first optical signal emitter on the first face, disposed in such a manner as to allow the emission of optical signals toward a first neighboring subscriber device; and
   a first optical signal receiver on the second face disposed in such a manner as to allow optical signals to be received that originate from a second neighboring subscriber device,
   the optical shutter traversing a part of the subscriber device, between the two opposing faces, and
   the control circuit being configured for imposing the opaque state of the optical shutter only if the subscriber device is operational,
   wherein the second face of the first subscriber device faces the first face of the second subscriber device and the second face of the second subscriber device faces the first face of the third subscriber device,
   wherein the first optical signal emitter of the third subscriber device is configured to emit optical signals towards the optical shutter of the second subscriber device and the first optical signal receiver arranged at the second face of the second subscriber device, and
   wherein, in a transparent state of the optical shutter of the second subscriber device, the optical signals emitted from the first optical signal emitter of the third subscriber device are directed to the first optical signal receiver arranged at the second face of the first subscriber device through the optical shutter of the second subscriber device.

2. The control system as claimed in claim 1, wherein each of the subscriber device is configured for operating placed in a receptacle, the subscriber device comprising one end comprising a connector configured to cooperate with a connector of the receptacle, said part of the subscriber device traversed by the optical shutter being adjacent to said end.

3. The control system as claimed in claim 1, wherein each of the subscriber device further comprises a detector of opacity of the optical shutter, the subscriber device being configured in such a manner as to allow the emission of an optical signal by the first optical signal emitter only if the detector of opacity detects an opaque state of the optical shutter and an electric circuit connected to the detector of opacity enables a signal corresponding to the opaque state of the optical shutter.

4. The control system as claimed in claim 1, wherein each of the subscriber device further comprises:
   a second optical signal emitter on the second face disposed in such a manner as to allow the emission of optical signals toward the second neighboring subscriber device; and
   a second optical signal receiver on the first face disposed in such a manner as to allow optical signals to be received that originate from the first neighboring subscriber device.

5. The subscriber device as claimed in claim 4, wherein the first optical signal emitter together with the first optical signal receiver, and the second optical signal emitter together with the second optical signal receiver, use optical signals of different wavelengths.

6. The control system as claimed in claim 1, wherein wavelengths of the optical signals emitted and/or received by each of the subscriber devices corresponds to the infrared light range.

7. The control system as claimed in claim 1, wherein wavelengths of the optical signals emitted and/or received by each of the subscriber devices corresponds to the visible light range.

8. The control system as claimed in claim 1, further comprising at least first and second receptacles each receiving at least one subscriber device, the control system furthermore comprising at least one optical fiber between the first receptacle and the second receptacle, the optical fiber allowing a communication by optical signals between a subscriber device positioned in the first receptacle and a subscriber device positioned in the second receptacle.

9. The control system as claimed in claim 1, further comprising at least one receptacle receiving the at least first, second, and third subscriber devices placed between a first end and a second end of said receptacle, the receptacle further comprising at least one reflector at least one of said first and second ends.

10. The control system as claimed in claim 1, further comprising at least one receptacle receiving the at least first, second, and third subscriber devices placed between a first end and a second end of said receptacle, the control system further comprising at least one optical fiber allowing an optical communication between said first and second ends.

11. The control system as claimed in claim 1, wherein the control circuit is configured for imposing the opaque state of the optical shutter only during the normal operation of the subscriber device.

12. An aircraft comprising:
a control system comprising:
a communications network;
at least first, second, and third subscriber devices to the communications network, each of the subscriber device comprising:
first and second opposing faces;
an optical shutter controllable between an at least partially transparent state allowing the transmission of optical signals between the subscriber devices to the communications network and an opaque state prohibiting the transmission of said optical signals;
a control circuit configured for controlling the optical shutter;
a first optical signal emitter on the first face, disposed in such a manner as to allow the emission of optical signals toward a first neighboring subscriber device; and
a first optical signal receiver on the second face disposed in such a manner as to allow optical signals to be received that originate from a second neighboring subscriber device,
the optical shutter traversing a part of the subscriber device, between the two opposing faces, and
the control circuit being configured for imposing the opaque state of the optical shutter only if the subscriber device is operational,
wherein the second face of the first subscriber device faces the first face of the second subscriber device and the second face of the second subscriber device faces the first face of the third subscriber device,
wherein the first optical signal emitter of the third subscriber device is configured to emit optical signals towards the optical shutter of the second subscriber device and the first optical signal receiver arranged at the second face of the second subscriber device, and
wherein, in a transparent state of the optical shutter of the second subscriber device, the optical signals emitted from the first optical signal emitter of the third subscriber device are directed to the first optical signal receiver arranged at the second face of the first subscriber device through the optical shutter of the second subscriber device.

13. The aircraft as claimed in claim 12, wherein the control circuit is configured for imposing the opaque state of the optical shutter only during the normal operation of the subscriber device.

* * * * *